United States Patent [19]

Krutenat et al.

[11] 4,229,234

[45] Oct. 21, 1980

[54] PASSIVATED, PARTICULATE HIGH CURIE TEMPERATURE MAGNETIC ALLOYS

[75] Inventors: Richard C. Krutenat, New Providence; Chih-an Liu, Fords, both of N.J.

[73] Assignee: Exxon Research & Engineering Co., Florham Park, N.J.

[21] Appl. No.: 384

[22] Filed: Dec. 29, 1978

[51] Int. Cl.$^2$ ............................................... H01F 1/06
[52] U.S. Cl. ................... 148/105; 75/0.5 BA; 148/6.3; 148/6.35; 252/472
[58] Field of Search ......... 75/0.5 R, 0.5 AA, 0.5 BA, 75/170, 171, 52; 252/459, 460, 461, 462, 466 B, 466 J, 470, 472, 477 R; 148/6.3, 6.35, 105, 16, 20.3; 427/248 C

[56] References Cited

U.S. PATENT DOCUMENTS

| | | | |
|---|---|---|---|
| 3,421,889 | 1/1969 | Ostertag et al. | 75/170 |
| 3,549,425 | 12/1970 | Segura et al. | 148/6.35 |
| 3,640,689 | 2/1972 | Glaski et al. | 428/932 |
| 3,700,505 | 10/1972 | Kanter | 148/6.35 |
| 3,730,779 | 5/1973 | Caule et al. | 148/6.35 |
| 3,914,507 | 10/1975 | Fustukian | 75/0.5 BA |
| 3,920,583 | 11/1975 | Pugh | 252/466 B |
| 3,932,204 | 1/1976 | Masumoto et al. | 75/170 |
| 3,939,086 | 2/1976 | Hagenback | 75/0.5 R |
| 3,975,217 | 8/1976 | Kumda et al. | 148/105 |
| 4,005,989 | 2/1977 | Preston | 75/171 |
| 4,096,095 | 6/1978 | Cairns | 252/466 B |
| 4,116,884 | 9/1978 | Hayashi et al. | 752/459 |
| 4,134,852 | 1/1979 | Volin | 252/472 |
| 4,157,315 | 6/1979 | Michels et al. | 423/213.5 |

FOREIGN PATENT DOCUMENTS 2262745  7/1973  Fed. Rep. of Germany ...... 75/0.5 BA

Primary Examiner—L. Dewayne Rutledge
Assistant Examiner—Michael L. Lewis
Attorney, Agent, or Firm—L. A. Proctor

[57] ABSTRACT

A process, and the compositions produced thereby, wherein an element characterized as aluminum, silicon or chromium, notably aluminum, is alloyed in relatively small concentrations with iron, cobalt or nickel, notably iron or cobalt, or both, which have relatively high Curie temperatures. Small amounts of yttrium, hafnium, zirconium or lanthanum can also be added. Alloys of specified composition are formed into particles of selected size, and the particles then contacted in an atmosphere of controlled oxygen activity at elevated temperature over selected time periods. By treatment with a low oxygen-containing, or low moisture-containing gas an oxide of the alloying element is formed which diffuses to the surface of the particles to form a film. The addition of these elements to the base metal necessarily, and unavoidably reduces the Curie temperature of the metal. However, by limiting the particle size and the amount of oxidation of the alloys, a relatively thin impervious oxide film can be formed on the surface of the alloy particle, and much of the lost Curie temperature can be recovered by the increased magnetization which occurs at the particle core when the oxidized form of the metal migrates, or diffuses, to the surface of the particle.

16 Claims, No Drawings

PASSIVATED, PARTICULATE HIGH CURIE TEMPERATURE MAGNETIC ALLOYS

Recently it has been discovered that a fluidized bed of magnetizable particulate solids can be stabilized when operated under the influence of a magnetic field, and that the cohesive forces produced between the particles changes the state, and mode of operation of the bed as contrasted with a conventional fluidized bed. The magnetically stabilized bed is useful for conducting various fluid-solids contacting processes; inclusive particularly of adsorption, absorption, particulate removal and catalytic processes. Notable among these are gas-solids contacting processes primarily designed for particulate capture but which may also feature a catalytic reaction, or reactions; or the process may be primarily designed for conducting a chemical reaction, or reactions, with or without the feature of particulate capture.

Like conventional fluidized processes a fluid, notably a gas, is injected upwardly through a bed of magnetizable particulate solids to maintain the particles of the bed in a fluidized state, or state wherein the bed has properties much like those of a liquid. In the operation of the magnetically stabilized bed, however, unlike the conventional fluidized bed, there is little, if any, motion exhibited by the particles within the fluidized bed. The formation of bubbles and slugs are virtually eliminated due to the interaction between the fluidized ferromagnetic particles and the magnetic field. The magnetically stabilized bed offer advantages over conventional fluidized bed operations in that they provide better counter-current contacting, low gas and solids back mixing, and lower particle attrition. For that matter, they also provide better operation as contrasted with the older, but universally used fixed bed operations in that they provide lower pressure drop, better ability to transfer solids, and virtually eliminate bed plugging problems. A process disclosing a magnetically stabilized bed and its mode of operation for conducting catalytic reactions, and the capture of particulates to provide a filtering action is disclosed in U.S. Pat. No. 4,115,927 by Ronald E. Rosensweig, which was issued Sept. 26, 1978.

Magnetically stabilized bed processes are conducted with compositions comprised of admixtures of ferromagnetic particles and non-ferromagnetic particles, or composites comprised of one or a plurality of ferromagnetic inclusions contained within a matrix material which is in itself usually non-ferromagnetic. A catalytic component, or components, may also be incorporated within a particle to render one or both particles of the admixture, or composite, magnetic. Preferred composites are those wherein the ferromagnetic particles are of elongate shape. Catalyst composites comprised of ferromagnetic particles of elongate shape, incorporated as inclusions within non-ferromagnetic materials which act as matrices for the ferromagnetic inclusions, it has been recently found, provide practical, economic commercial gas solid contacting processes which utilize far less energy to maintain an effective magnetic field.

The magnetically stabilized bed offers particular advantages in certain high temperature applications, notably in hydroforming (reforming) and in use as fluid bed fly-ash filters. In this regard, however, there is no known catalyst, or composite, of sufficient magnetic character to be used in such operations. Only iron and cobalt, or alloys of such metals have sufficiently high Curie temperatures to remain magnetic at temperatures above 510° C., the minimum temperature requirement for conducting reforming operations; and only cobalt or alloys of cobalt have a sufficiently high Curie Temperature to remain magnetic at temperatures ranging from about 840° C. to about 1065° C. which is the expected temperature of operation of fly ash filters. The development of fly ash filter beds is of particular importance in its environmental implications, as well as for the protection of the turbine blades of power generators. Unfortunately, however, unprotected iron and cobalt, and metallic alloys or these metals are attacked by the liquids and gases of the process streams, these metals becoming rapidly oxidized at such conditions and losing their magnetic character. These metals, and alloys of these metals must therefore be protected, or passivated in some manner to prevent attack if they are to be used at such conditions. It appears, however, that nature has presented a quite difficult problem for not only are iron and cobalt unique in their potential for use in high temperature applications in the first place, but it appears that Curie temperature must be sacrificed because of the necessity to form alloys, or add metals to the base metals to passivate them from attack at process conditions. The lowering of the Currie temperature of the alloys, however, makes them unsuitable for high temperature applications. In attempting to minimize the concentrations of the passivating metals added to the alloys to avoid undue suppression of Curie temperature, the useful life of composites, or catalysts, made from these ferromagnetic alloys is thus compromised. Moreover, catalyst preparation procedures are often harmful to the metallic alloy particles. For example, in preparing a catalyst for reforming applications, during impregnation with chloroplatinic acid the metals are often attacked. Furthermore, an unacceptable amount of platinum is deposited on the alloy particles, the platinum being rendered ineffective in the performance of its catalytic function and hence wasted.

It is, nonetheless, a primary objective of the present invention to obviate these and other prior art difficulties, particularly by providing a novel process for the production of passivated alloys of ferromagnetic metals useful in magnetically stabilized bed processes, and novel passivated ferromagnetic alloys for admixture with non-ferromagnetic particles, or novel particulate compositions wherein the passivated ferromagnetic alloys are incorporated as an inclusion, or inclusions, in a non-ferromagnetic matrix.

A specific object is to provide a novel process for the production of novel catalytic compositions, and the compositions produced thereby wherein the passivated ferromagnetic alloys are incorporated as an inclusion, or inclusions, in a non-ferromagnetic catalytically active matrix.

A further, and more specific object is to provide a process for the production of novel compositions, and the novel compositions produced thereby, both catalytic and non-catalytic, which are particularly useful in high temperature applications.

These and other objects are achieved in accordance with the present invention wherein an element characterized as aluminum, silicon, or chromium, especially aluminum, is alloyed in relatively small concentrations with iron, cobalt or nickel, particularly iron or cobalt, or both, which have relatively high Curie temperatures, the alloy formed into particles of selected size, and the particles then contacted at elevated temperature with an atmosphere of controlled, low oxygen activity to form an oxide of the alloying element which migrates to the surface of the particles and forms a film. The addition of one or more of the alloying elements to iron, cobalt or nickel necessarily, and unavoidably reduces the Curie temperature of the respective metal, but by limiting the particle size and the amount of oxidation of alloys of specified composition, a relatively thin impervious oxide film of the alloying element can be formed on the surface of the alloy particles and much of the lost Curie temperature recovered by the increased magnetization of the particle cores which occurs when the oxidized form of the alloying element migrates, or diffuses, to the surface of the particle to form the thin, impervious oxide film.

In the preferred method, compositions based on either iron or cobalt, or both, are alloyed with aluminum, silicon or chromium in concentrations ranging up to about 30 percent, most suitably from about 1 percent to about 30 percent, based on the weight of the composition. For iron based alloys, the aluminum, silicon, chromium, or an admixture thereof, is preferably added to the base metal in concentration ranging from about 15 percent to about 20 percent based on the weight of the total composition. For cobalt based alloys, preferably the alloying element is added in concentration ranging from about 1 to about 6 percent, preferably from about 4 to about 6 percent, based on the weight of the total composition. Preferably also, small concentrations of yttrium, hafnium, zirconium, or lanthanum, generally from about 0.01 percent to about 1 percent, more preferably from about 0.1 to about 0.5 percent, based on the total weight of the alloy composition, can also be added to improve the adherence of the oxide layers of the alloying elements that are formed on the alloy surface.

The alloys are formed into particles of average diameter ranging from about 20 to about 1500 microns, preferably from about 20 to about 1000 microns, and the particles then contacted, or treated in a low oxygen-containing atmosphere, or low moisture-containing gas at an elevated temperature for a time sufficient to form a single-phase oxide film of thickness ranging from about 0.1 micron to about 5 microns, preferably from about 0.2 microns to about 2 microns. Treatment of the alloys at elevated temperature in an atmosphere of controlled oxygen activity causes the oxides of the alloying elements, i.e., aluminum, chromium and silicon, or combination thereof, to form preferentially to the formation of the base metal oxides. This is accomplished by keeping the available oxygen, or oxygen concentration lower than the dissociation pressure of the respective base oxide. In the course of the formation of the protective oxide scale, or film, the minor element diffuses outwardly to the surface of the particle and become depleted in the body, or core, of the particle. As this occurs the Curie point of the particle which characterizes that of the untreated alloy is found to rise toward the Curie point of the pure base metal, or element. The oxide of the alloying element simultaneously forms a continuous protective oxide layer, or film, on the surface of the particle. Suitably, the particulate alloy is treated at temperatures ranging from about 600° C. to about 1200° C., preferably from about 800° C. to about 1000° C., for periods ranging from about 0.5 hour to about 20 hours, or more preferably for periods ranging from about 1 hour to about 2 hours, with the low oxygen-containing gas, suitably air, to form an impervious, protective, and highly resistance oxide coating of the desired thickness. Suitably also, when the particulate alloy is treated at temperatures ranging from about 800° C. to about 1200° C., preferably from about 1000° C. to about 1200° C., for periods ranging from about 20 hours to about 100 hours with a low moisture-containing gas, e.g., hydrogen saturated with water at 0° C., a highly impervious oxide film is formed.

The protective scale, or film, is formed on the magnetic alloy particles by treatment in an atmosphere of low oxygen activity, or atmosphere wherein the oxygen partial pressure, whether supplied by molecular oxygen or oxygen produced by chemical reaction with water, is below the oxidation pressure of an oxide of the base metal at the temperature of treatment. Particulate iron alloys are preferably treated in a low oxygen-containing gas, suitably air, at a partial oxygen pressure below the oxidation pressure at which iron can form an oxide at the temperature of treatment. An impervious oxide scale, or film, can be readily developed on the surface of the surface of the particles by such treatment, this not only making the particles more highly corrosion resistant, but also impervious to other types of chemical attack. For example, iron alloy particles treated in this manner are not susceptable to attack by chloroplatinic acid solutions, which is so important in the preparation of reforming catalysts. Moreover, the magnetic properties of the iron alloy particles in such treatment are readily maintained at about 700° C., a temperature well above those required in reforming processes.

Particulate cobalt alloys can also be treated in low oxygen environment where the oxygen partial pressure is lower than the dissociation pressure of cobalt oxide, at which condition only the alloying element will form a protective scale. The effect of the alloying elements on cobalt in the suppression of Curie temperature, at similar concentration, is far more sensitive than with iron. It is found that roughly about one-third of the concentration of aluminum, silicon, or chromium, respectively, is required to lower the Curie temperature of cobalt a given amount as is required to lower the Curie temperature of iron by the same amount. In order to preserve high temperature magnetic properties at about the 950° C. level, only a low concentration of the alloying element is added to the cobalt, based on the weight of the total composition. Thereafter, in any event, to further improve corrosion resistance, the particles of the cobalt alloy are preferably treated at elevated temperature in a low moisture-containing atmosphere, or atmosphere wherein the oxygen for the reaction is supplied by the chemical reaction of water. Preferred treating gases are wet hydrogen, or a wet mixture of carbon monoxide and coarbon dioxide gases; most preferably hydrogen which has been saturated with water at 0° C. The treatment is continued for a time sufficient to form a protective oxide scale, or film. In a particularly preferred embodiment the particulate cobalt alloy is treated with the moist hydrogen at temperature ranging from about 1000° C., at which temperature the oxygen partial pressure is kept below about $10^{-12}$ atmospheres, to about 1200° C., at which temperature the oxygen partial pressure is kept below about $10^{-9}$ atmospheres, for periods ranging from about 20 hours to about 100 hours to form an oxide on the surface of the particles and provide a protective scale ranging from about 2 microns to about 5 microns in thickness. The low moisture oxidation, at the same time it forms the protective scale, or film, simultaneously improves the high temperature magnetic properties.

Aluminum is a particularly preferred alloying element because transport rates of aluminum in an $Al_2O_3$ lattice are very low, and aluminum on transport to the exterior of the particle is not converted to a carbide in a hydrocarbon environment even at high temperatures. In the preferred combination aluminum is added to iron; and in a more preferred combination it is added to cobalt, or both cobalt and iron, in concentration ranging from about 4 to about 6 percent, based on the weight of the alloy composition.

The addition of aluminum, silicon or chromium, or admixture thereof, unavoidably reduces the Curie temperature of the resultant alloy vis-a-vis the base metal, i.e., iron, cobalt or nickel. However unfortunate, this is unavoidable, and indeed with respect to high temperature magnetic bed applications it appears that nature has been somewhat ruthless in its failure to provide a more bountiful supply of high Curie point metals for high temperature magnetic bed applications. On top of this, the oxides which are formed are non-magnetic, and so the necessity of having to passivate a metal by adding an oxide-forming additive renders the problem yet more acute because an oxide coating will shroud the alloy and further reduce its magnetic character. Nonetheless, it has now been recognized, and verified, that when an iron, cobalt or nickel alloy which contains aluminum, silicon or chromium is oxidized at specified conditions, the oxidized metal will be transported, or diffused to the surface of the alloy particle. Consequently, the core of the particle will contain less of the oxidized metal, and the total magnetism of the particle will be increased. In accordance with this invention therefore, a balance is achieved between the thickness and quality of the oxide film requried for passivation, and the size and composition of the alloy particles, such that much of the Curie temperature originally lost by the addition of the alloying components is recovered by the increased magnetization which occurs at the core of the particles as a result of the increased concentration of the magnetic metal at that location. In other words, though the addition of the alloying metal necessarily lowers the Curie temperature of the base metal, which is unavoidable; nonetheless these compositions, of selected particle size and composition, on oxidation over specified temperature-time periods in a low oxygen, low moisture-containing gas, will recover much of the initially lost Curie temperature by moving the Curie point upward in temperature due to the increased magnetization at the particle cores.

The invention will be more fully understood by reference to the following selected demonstrations and examples which present comparative data which illustrates its more salient features. All parts are given in terms of weight except as otherwise specified.

EXAMPLE 1

In order to demonstrate the production of a passivated, particulate magnetic alloy suitable for use in the preparation of a catalyst composite useful for fluidized magnetically stabilized bed operations, at reforming conditions, a portion of Fe 25 Cr 5Al 0.5 Y (wt. %) magnetic alloy particles of 44 micron average particle size diameter, produced by gas atomization, was treated in a rotary furnace by contact with air at a temperature of 1000° C. for a period of 24 hours. Examination of the particles subsequent to this period showed that the particles developed on their surface a predominantly $Al_2O_3$ oxide scale of 1.5 microns thickness.

The particles were then completely immersed in an aqueous solution of chloroplatinic acid [31.2 cc stock solution (25 mg/cc Pt) and 3.5 cc conc. HCl in $H_2O$)/375 cc distilled $H_2O$] for a period of several days, while the particles and solution were agitated. The particles were found to be totally impervious, or chemically resistant to the acid.

The Curie temperature of the particles, initially 564° C., was raised by the treatment to 683° C.

The particles had a magnetic induction of 125 EMU/gm.

The particles therefore were found to be highly ferromagnetic, chemically passivated, and well suited for incorporation as ferromagnetic inclusions within a reforming catalyst for magnetically stabilized bed operations. The particles are also suitable for use in the production of catalytic cracking catalysts, flue gas desulfurization catalysts, and the like.

EXAMPLES 2-4

To demonstrate the production of passivated, particulate ferromagnetic alloys suitable for use as a capture medium for fly ash filtering in a fluidized magnetically stabilized bed operation, a series of cobalt alloys with 4-6 weight percent aluminum or 4-6 weight percent of a mixture of aluminum and silicon were employed, to wit: Co4Al, Co-3Al-2Si and Co5Si. Portions of these different cobalt alloys, in particle sizes ranging from 500 microns to 1500 microns, were individually treated at 1000° C. in an atmosphere of moist hydrogen ($H_2O:H_2$ admixed in a 1:30 ratio) in a rotary furnace for a period of 20 hours. The particles of each portion were found to have developed an oxide of the respective alloying element, or elements, of 0.5 micron thickness.

Protection of the particles against oxidation was demonstrated at 800° C. for periods ranging from 2 to 4 hours.

Treatment at these conditions for a period of up to 100 hours, or treatment at 1200° C. for a period of up to 100 hours will produce thicker films; films which will bring the Curie temperature to 950° C., provide superior magnetic induction, and produce particles resistant to flue gas environments.

The passivated, high Curie temperature alloy particles of the present invention are useful per se or as inclusions for the preparation of magnetizable solids composites, catalytic or noncatalytic, for use in processes inclusive particularly of adsorption, absorption, particulate removal and catalytic processes. The compositions are particularly useful as filters for the removal of contaminant particles from a gas stream, whether or not the particles additionally function as catalysts. Catalytic composites of the passivated, particulate high Curie temperature magnetic alloy particles are also particularly useful in conducting high temperature hydrocarbon conversion reactions illustrative of which is fluid hydroforming (reforming), but also are useful in conducting such reactions as catalytic cracking, isomerization, coking, polymerization, hydrofining, alkylation, partial oxidation, halogenation, dehydrogenation, desulfurization, reductions, gasification of coal, fluid bed combustion of coal, coal liquefaction, retorting of oil shale and the like. In conducting a magnetically stabilized fluidized bed reaction the passivated, particulate high Curie temperature alloys of this invention can be admixed, and formulated with virtually any type of conventional catalyst recipe.

In the preparation of composites, catalytic or non-catalytic, the passivated, high Curie temperature ferromagnetic alloy particles are dispersed as inclusions, suitably spaced apart one from another, separated, or present in dilute concentration; the admixture generally containing from about 0.5 to about 50 percent, preferably from about 5 to about 40 percent of the high Curie temperature ferromagnetic alloy particles, based on the volume of the total admixture. Where the composite formed is catalytic, the catalytic component, or components, should also be well dispersed upon the composite particles. Preferably the catalytic component, or components, is dispersed to a high surface area state upon the composite particles; the composite particles serving the same function as conventional catalyst supports. In a catalytically effective state of dispersion, a catalytically active concentration of the catalytic component, or components, is present on the surface of the particles in essentially atomically dispersed form, as defined by the size of the crystals of the dispersed catalytic component, or components (length of a side of an assumed cubic crystallite).

The composite particles contain the high Curie temperature ferromagnetic alloy particles as inclusions, preferably as inclusions within a matrix constituted of a refractory porous inorganic oxide support with which the catalytic component, or components, is composited. The composite is suitably formed by cogellation of the high temperature ferromagnetic alloy particles with a catalytic metal component, or components, or by impregnation of a support, performed to contain said inclusions, with a solution which contains a soluble compound, or compounds, of the catalytic metal, or metals. The support per se, aside from the inclusions, can be constituted of, or contain, for example, one or more of alumina, bentonite, clay, diatomaceous earth, zeolite, silica, magnesia, zirconia, thoria, and the like. The most preferred support is alumina to which, if desired, can be added a suitable amount of other refractory carrier materials such as silica, zirconia, magnesia, titania, etc., usually in a range of about 1 to 20 percent, based on the weight of the support. Exemplary of a support for the practice of the present invention is one having a surface area of more than 50 m²/g., preferably from about 100 to about 300 m²/g, and higher, a bulk density of about 0.3 to 1.0 g/ml, and higher, an average pore volume of about 0.2 to 1.1 ml/g., and an average pore diameter ranging about 30 Å to about 300 Å, and higher.

Essentially any catalyst component, or components, can be composited with the support particles, with said inclusions, dependent upon the type of reaction which is to be carried out. For example, in conducting hydrocarbon conversion reactions, e.g., a hydroforming (reforming, with hydrogen) reaction, a catalyst can be formed which comprises a composite of a refractory or inorganic oxide support material, particularly alumina, and a Group VIII noble metal hydrogenation-dehydrogenation component (Periodic Table of the Elements, Sargent-Welch Scientific Company, Copyright 1968), e.g., ruthenium, rhodium, palladium, osmium, iridium or platinum, notably platinum, to which a promoter metal, e.g., rhenium, iridium or the like may be added to promote the activity and selectivity of the catalysts. Suitably, the reforming catalyst, or composite also contains an added halogen component to provide acidity, particularly fluorine or chlorine, and preferably the promoter component is introduced into the support, or catalyst, by impregnating same with a solution comprising a soluble salt or compound thereof.

The catalyst composites of this invention may be in the form of powder, beads, tablets, pills, or pellets or extrudates depending upon the type of process. The passivated, high Curie temperature ferromagnetic particles used alone or in admixture with non-ferromagnetic particles, permit operation in corrosive, high temperature environments for conducting magnetically stabilized fluidized bed reactions.

Having described the invention, what is claimed is:

1. A process for the preparation of passivated, particulate high Curie temperature magnetic alloys which are useful per se or as inclusions for the preparation of magnetizable solids composites, catalytic or non-catalytic, which comprises alloying an element characterized as aluminum, silicon, chromium, or admixture thereof, in concentration ranging up to about 30 percent, based on the total weight of the alloy, with a base metal comprised of cobalt or nickel, forming particles of the alloy which range in average diameter from about 20 microns to about 1500 microns, and then contacting the alloy particles with an atmosphere of low oxygen activity, the oxygen partial pressure of which is lower than the dissociation pressure of an oxide formed from the base metal, sufficient to preferentially oxidize the alloying element and cause it to diffuse to the surface of the particles to form an impervious oxide film of thickness ranging from about 0.1 micron to about 5 microns.

2. The process of claim 1 wherein the alloying element is aluminum.

3. The process of claim 1 wherein the base metal is cobalt.

4. The process of claim 1 wherein the alloying element is aluminum, and the base metal is cobalt.

5. The process of claim 1 wherein the base metal is cobalt, and the alloying element is added in concentration ranging from about 1 percent to about 6 percent.

6. The process of claim 1 wherein the base metal is cobalt, and the atmosphere of low oxygen activity is moist hydrogen or a moist admixture of carbon monoxide and carbon dioxide.

7. The process of claim 6 wherein the atmosphere of low oxygen activity is hydrogen, and the hydrogen is saturated with water at 0° C.

8. The process of claim 1 wherein the particulate alloy is contacted with a gas of low oxygen activity at temperatures ranging from about 600° C., for periods ranging from about 0.5 hour to about 20 hours.

9. The process of claim 8 wherein the temperature of the contacting gas ranges from about 800° C. to about 1000° C.

10. The process of claim 1 wherein the particulate alloy is contacted with a gas of low oxygen activity comprising low moisture-containing gas at temperatures ranging from about 800° C. to about 1200° C. for periods ranging from about 20 hours to about 100 hours.

11. The process of claim 10 wherein the temperature of the contacting gas ranges from about 1000° C. to about 1200° C.

12. The process of claim 1 wherein the average diameter of the alloy particles ranges from about 20 to about 1000 microns.

13. The process of claim 1 wherein the thickness of the oxide film formed on the surface of the alloy particle ranges from about 0.2 microns to about 2 microns.

14. The process of claim 1 wherein yttrium, hafnium, zirconium or lanthanum is added in concentrations ranging from about 0.01 percent to about 1 percent to form the alloy.

15. The process of claim 14 wherein the yttrium, hafnium, zirconium or lanthanum is added in concentrations ranging from about 0.1 percent to about 0.5 percent.

16. The process of claim 1 wherein the alloy that is formed is Co5Al, Co5Si, or Co3Al 2Si.

* * * * *